(12) United States Patent
Kobatake et al.

(10) Patent No.: US 6,324,050 B1
(45) Date of Patent: Nov. 27, 2001

(54) SOLID ELECTROLYTIC CAPACITOR AND METHOD OF MANUFACTURING THE SAME

(75) Inventors: Yasuhiro Kobatake, Osaka; Yukihiro Nitta, Kyoto; Kazuyo Saito, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/505,602

(22) Filed: Feb. 16, 2000

(30) Foreign Application Priority Data

Feb. 16, 1999 (JP) .................................................. 11-036686

(51) Int. Cl.⁷ ................................ H01G 9/00; H01G 9/04
(52) U.S. Cl. ............................................. 361/523; 361/528
(58) Field of Search ................................... 361/523, 524, 361/525, 528

(56) References Cited

U.S. PATENT DOCUMENTS

| | | |
|---|---|---|
| 4,085,435 | 4/1978 | Galvagni . |
| 4,110,815 | 8/1978 | Frade et al. . |
| 4,785,380 | 11/1988 | Harakawa et al. . |
| 4,805,074 | 2/1989 | Harakawa et al. . |
| 4,934,033 | 6/1990 | Harakawa et al. . |
| 5,428,500 | * 6/1995 | Nishiyama et al. .................. 361/525 |
| 5,432,029 | 7/1995 | Mitate et al. . |
| 5,443,602 | 8/1995 | Kejha . |
| 5,473,503 | * 12/1995 | Sakata et al. ........................ 361/525 |

FOREIGN PATENT DOCUMENTS

| | | |
|---|---|---|
| 59-23889 | 2/1984 | (JP) . |
| 60-137923 | 7/1985 | (JP) . |
| 62-165313 | 7/1987 | (JP) . |
| 63-158829 | 7/1988 | (JP) . |

* cited by examiner

Primary Examiner—Anthony Dinkins
(74) Attorney, Agent, or Firm—Ratner & Prestia

(57) ABSTRACT

A conductive high polymer layer as an electrolyte is formed on the entire surface of fine pores of a dielectric oxide layer of an anode electrode having an undulated surface of fine pores or the like. As a result, a solid electrolytic capacitor having characteristics such as capacitance, impedance, and leak current exactly as designed will be obtained. It includes a manganese dioxide layer composed of a porous sinter of valve metal or roughened meal foil, placed continuously on the entire surface of the undulated surface of a dielectric oxide layer of an anode electrode having an undulated surface, a conductive high polymer layer formed by electrolytic polymerization, in contact with the surface of the manganese dioxide layer, and a cathode electrode placed on this conductive high polymer layer.

11 Claims, 4 Drawing Sheets

SOLID ELECTROLYTIC CAPACITOR AND METHOD OF MANUFACTURING THE SAME

TECHNICAL FIELD OF THE INVENTION

The present invention relates to a solid electrolytic capacitor using a conductive high polymer in the electrolyte used in various electronic appliances, and a method of manufacturing the same.

BACKGROUND OF THE INVENTION

Owing to the advancement in digital appliances, recently, capacitors having a low impedance and an excellent high frequency characteristic even in a high frequency region are strongly demanded. To meet such market needs, capacitors using conductive high polymers obtained by polymerizing pyrrole, thiophene or aniline as the electrolyte are being developed and commercially produced.

Hitherto, a solid electrolytic capacitor of this kind comprises, as disclosed in Japanese Laid-open Patent No. 63-158829, an anode electrode made of a valve metal having a dielectric oxide layer, the dielectric oxide layer formed on this anode electrode, a conductive high polymer layer formed by pyrolysis of manganese dioxide layer on this dielectric oxide layer, and a cathode electrode placed on this conductive high polymer layer. The conductive high polymer layer is formed by electrolytic process in an electrolytic polymerization solution using manganese dioxide layer as the anode.

Formation of conductive high polymer layer by this electrolytic polymerization is quick in forming a conductive high polymer layer as compared with chemical polymerization or vapor phase polymerization, and it requires a relatively simple equipment, and hence it is said to be beneficial for industrial production.

In the prior art, however, the forming condition of manganese dioxide layer has great effects on the principal characteristics of the solid electrolytic capacitor such as capacitance, tan δ and impedance.

That is, when the anode electrode is formed by a method of bonding particles of valve metal into a porous substance by sintering, or a method of multiple etching pits by etching process, such anode electrode has an undulated surface of an expanded surface area of fine pores or the like. The dielectric oxide layer formed on the surface of the anode electrode having fine pores has multiple fine pores and exposed portions reaching the inner depth. In the prior art, the manganese dioxide layer formed on this dielectric oxide layer is formed only on the exposed portions, and not formed in the inner parts of the fine pores. The conductive high polymer layer is formed only on this manganese dioxide layer. That is, in such conventional solid electrolytic capacitor, it was possible to have a cavity in the inside. In such conventional constitution, when the anode electrode has an expanded undulated surface, sufficient capacitance and sufficient impedance corresponding to the expanded undulated surface could not be obtained. Thus, there were serious problems also in the constitution of using conductive high polymer as the electrolyte.

It is hence an object of the invention to present a solid electrolytic capacitor exhibiting a desired effect sufficiently, in the solid electrolytic capacitor using an anode electrode having an undulated surface and a conductive high polymer as electrolyte, and a method of manufacturing the same.

SUMMARY OF THE INVENTION

The solid electrolytic capacitor of the invention comprises:

(a) an anode electrode having a first undulated surface, (b) a dielectric oxide layer placed on a first undulated surface of the anode electrode, in which the dielectric oxide layer includes a second undulated surface placed continuously coinciding with the shape of the first undulated surface, (c) a manganese dioxide layer placed on the second undulated surface of the dielectric oxide layer, in which the manganese dioxide layer includes a continuous third undulated surface, placed coinciding with the shape of the second undulated surface, on the second undulated surface of the dielectric oxide layer, (d) a conductive high polymer layer placed on the third undulated surface of the manganese dioxide layer, in which the conductive high polymer layer is placed on the third undulated surface of the manganese dioxide layer, and (e) a cathode layer placed above the conductive high polymer layer.

The manufacturing method of solid electrolytic capacitor of the invention comprises:

(a) a step of supplying an anode electrode having a first undulated surface, (b) a step of forming a dielectric oxide layer on the first undulated surface, in which the dielectric oxide layer includes a second undulated surface coinciding with the first undulated surface, (c) a step of forming a manganese dioxide layer on the second undulated surface, in which the manganese dioxide layer includes a continuous third undulated surface, placed coinciding with the shape of the second undulated surface, on the second undulated surface, (d) a step of forming a conductive high polymer layer on the third undulated surface, in which the conductive high polymer layer is formed on the third undulated surface of the manganese dioxide layer, and (e) a step of forming a cathode layer above the conductive high polymer layer.

Preferably, the manganese dioxide layer is placed in contact with the entire surface of concave and convex portions of the second undulated surface.

Preferably, the conductive high polymer layer is placed in contact with the entire surface of concave and convex portions of the third undulated surface.

Preferably, the first undulated surface has a surface with a plurality of fine pores and exposed portions.

Preferably, the anode electrode having the first undulated surface has a porous sinter of valve metal or a roughened metal foil.

Preferably, the conductive high polymer layer has a conductive high polymer layer formed by electrolytic polymerization.

Preferably, it also includes a step of impregnating the manganese dioxide layer sufficiently in a 6.5 wt. % to 26.5 wt. % aqueous solution of manganese nitrate at 10° C. to 40° C. sufficiently, and lifting, and a subsequent step of removing the excess portion of aqueous solution of manganese nitrate adhered to the surface and a step of heating to more than 80% of pyrolysis temperature within a minute and performing pyrolysis for three minutes or more at 300±10° C.

In this constitution and manufacturing method, a manganese dioxide layer can be formed on the entire surface of the undulated surface of the oxide film without damaging the dielectric oxide film of the anode electrode having fine pores or undulated surface. Accordingly, the conductive high polymer layer by electrolytic polymerization is formed securely from the inner surface of fine pores to the outer surface. As a result, a capacitor having the capacitance, impedance, leak current and other characteristics exactly as designed is obtained.

Reference Numerals

Figure 1:
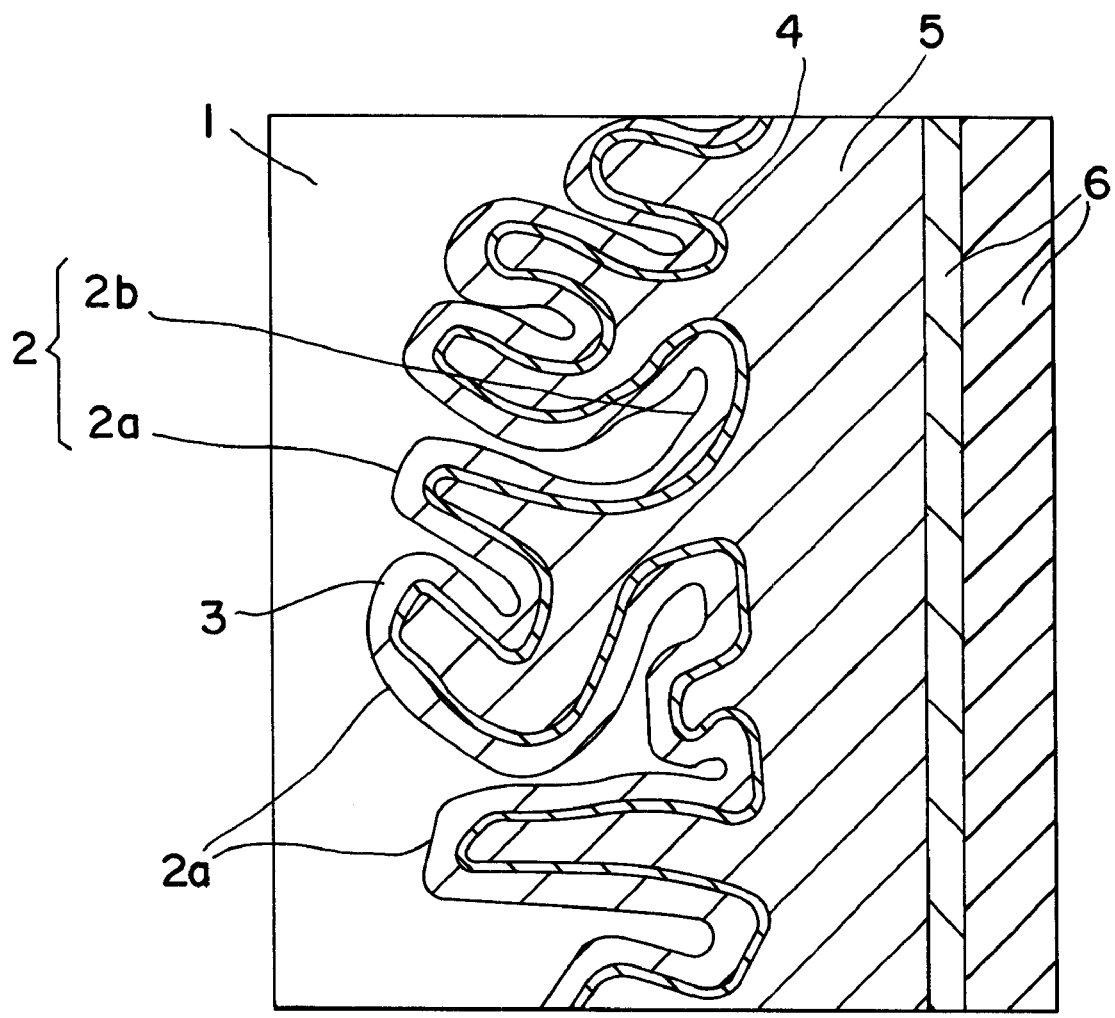
FIG. 1 is a sectional view showing principal parts of a solid electrolytic capacitor in an embodiment of the invention.

1 Aluminum metal foil
2 Undulated surface
2a Fine pore
2b Exposed portion
3 Dielectric oxide film
4 Manganese dioxide layer
5 Conductive high polymer layer
6 Cathode layer

DETAILED DESCRIPTION OF THE INVENTION

A solid electrolytic capacitor in an embodiment of the invention comprises an anode electrode having a first undulated surface of porous sinter of valve metal or roughened metal foil, a dielectric oxide layer having a second undulated surface placed on the first undulated surface of the anode electrode, a manganese dioxide layer having a third undulated surface placed on the second undulated surface of the dielectric oxide layer, a conductive high polymer layer formed by electrolytic polymerization in contact with the third undulated surface of the manganese dioxide layer, and a cathode electrode placed on this conductive high polymer layer. The conductive high polymer layer has a function as an electrolyte.

The first undulated surface of the anode electrode has a widened surface having fine pores and exposed portions. The dielectric oxide film also has the second undulated surface placed on the first undulated surface without gap. The manganese dioxide layer further has the third undulated surface placed on the second undulated surface without gap. Moreover, the conductive high polymer layer is placed on the third undulated surface without gap. In this constitution, the all surface region including the fine pores of the expanded first undulated surface of the anode electrode acts effectively for the capacitor characteristics, and, as a result, the solid electrolytic capacitor having the characteristics exactly as designed, such as the capacitance, impedance and leak current, will be obtained.

Preferably, the manganese dioxide layer is contained by 5 to 15 ng per unit surface area 1 mm$^2$ of the dielectric layer.

Herein, "ng" stands for nanogram, and 1 ng is equal to 10$^{-9}$ g. If the content of the manganese dioxide layer is small than this range, the manganese dioxide layer may not be formed in the entire surface. If the content of the manganese dioxide layer is more than this range, the manganese dioxide layer may be formed excessively so as to plug the openings of fine pores.

Therefore, by containing the manganese dioxide layer in a range of 5 to 15 ng per unit surface area 1 mm$^2$ of the dielectric layer, the capacitor having the characteristics exactly as designed will be realized.

Preferably, the manganese dioxide layer is formed by pyrolysis of aqueous solution of manganese nitrate at concentration of 6.5 to 26.5 wt. %. In this range of concentration, the aqueous solution of manganese nitrate permeates deeply into the fine pores, and the manganese dioxide layer is formed on the entire surface of the dielectric oxide layer.

A manufacturing method of solid electrolytic capacitor in the embodiment of the invention includes:

a step of supplying an anode electrode having a first undulated surface of a porous sinter of valve metal or roughened metal foil, a step of forming a dielectric oxide layer having a second undulated surface of a continuous shape coinciding with the shape of the first undulated surface, on the first undulated surface, by forming treatment of the anode electrode having the first undulated surface, a step of forming a manganese dioxide layer having a third undulated surface of a continuous shape on the second undulated surface of the dielectric oxide layer by pyrolysis treatment, by impregnating the formed dielectric oxide layer in an aqueous solution of manganese nitrate at concentration of 6.5 to 26.5 wt. %, a step of forming a conductive high polymer layer on the third undulated surface of the manganese dioxide layer by passing current in the manganese dioxide layer in an electrolytic polymerization solution, and a step of forming a cathode electrode on the conductive high polymer layer.

In this method, too, all the surface region including fine pores of the expanded first undulated surface of the anode electrode acts effectively for the capacitor characteristics, and, as a result, the solid electrolytic capacitor having the characteristics exactly as designed, such as the capacitance, impedance and leak current, will be obtained. Moreover, the conductive high polymer layer corresponding to the entire surface including the fine pores of the anode electrode can be formed. As a result, the solid electrolytic capacitor having excellent characteristics will be obtained.

Preferably, the aqueous solution of manganese nitrate permeates into the anode electrode in a temperature range of 10 to 40° C. In this range, the aqueous solution of manganese nitrate permeates in a short time, and breakage of the dielectric oxide layer is prevented.

Preferably, impregnation of the aqueous solution of manganese nitrate continues until sufficiently permeating into the fine pores of the anode electrode. By this method, the manganese dioxide layer is formed on the entire surface of the anode electrode.

Preferably, after impregnation of the aqueous solution of manganese nitrate into the anode electrode, the excess portion of the aqueous solution of manganese nitrate adhered to the surface of the anode electrode is removed. By this method, plugging of the openings of the fine pores is prevented when forming the manganese dioxide layer.

Preferably, the pyrolysis treatment is performed at high humidity. By this method, a dense manganese dioxide layer is formed. As a result, the capacitor characteristics are enhanced.

Preferably, the pyrolysis treatment is performed in a state of high humidity with the steam content of 85±10 vol.%. By this method, a dense manganese dioxide layer is formed. As a result, the capacitor characteristics are enhanced.

Preferably, in the pyrolysis treatment, by heating up to 80% of the pyrolysis temperature in a minute, the pyrolysis temperature is held for at least three minutes. By this method, the dense manganese dioxide layer is formed securely into the inner parts of the fine pores.

Preferably, the pyrolysis temperature of the pyrolysis treatment is 300±10° C. By this method, a dense manganese dioxide layer is formed securely.

A specific embodiment of the invention is described below while referring to the drawings.

The constitution of the solid electrolytic capacitor in the embodiment of the invention is described while referring to FIG. 1 to FIG. 4. As an embodiment of the anode electrode, a solid electrolytic capacitor using an aluminum metal foil roughened by etching is explained below.

FIG. 1 is a magnified sectional view of principal parts of the solid electrolytic capacitor in the embodiment of the invention. In FIG. 1, an aluminum metal foil 1 as an anode electrode includes a first undulated surface 2 having multiple fine pores 2a and exposed portions 2b formed by etching. A dielectric oxide layer 3 formed by forming treatment is placed on the entire surface of the first undulated surface 2 of the aluminum metal foil 1. This dielectric oxide layer 3 has a second undulated surface coinciding with the shape of the first undulated surface. A thin manganese dioxide layer 4 is formed on the entire surface of the second undulated surface of the dielectric oxide layer 3 (that is, the entire surface including the dielectric oxide layer 3 formed in the fine pores 2a). The manganese dioxide layer has a third undulated surface coinciding with the shape of the second undulated surface. The manganese dioxide layer has a manganese dioxide layer of a continuous shape, formed on the second undulated surface. A conductive high polymer layer 5 of polypyrrole, polythiophene, or polyaniline is formed on the third undulated surface of the manganese dioxide layer 4 by electrolytic polymerization method or the like. Further, a cathode electrode 6 of carbon paste layer or silver paste layer is placed on this conductive high polymer layer 5.

Preferably, the manganese dioxide layer is uniformly placed on the entire surface of concave and convex portions of the second undulated surface, and more preferably placed in contact without gap.

The conductive high polymer layer is uniformly placed on the entire surface of concave and convex portions of the third undulated surface, and more preferably placed in contact without gap.

Figure 2:
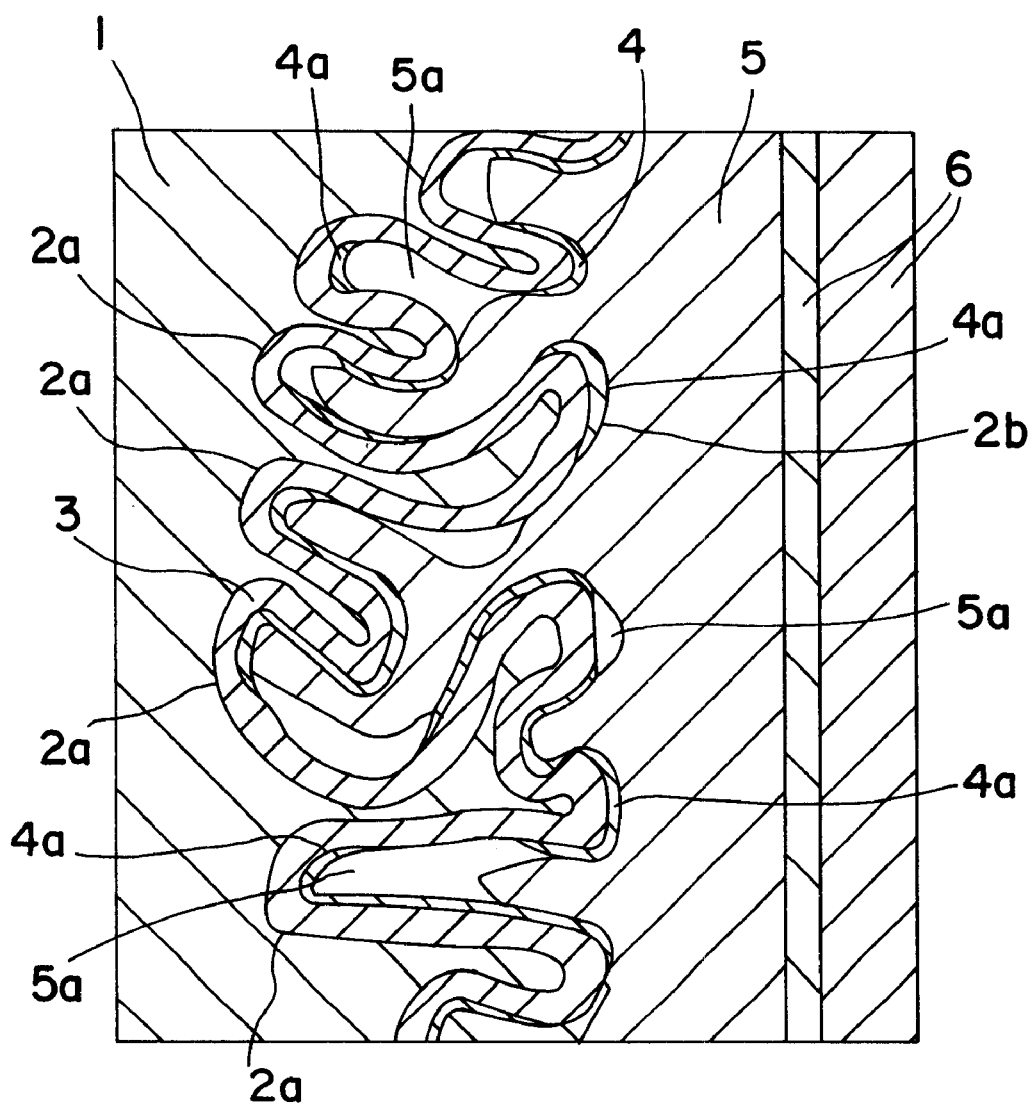
FIG. 2 is a sectional view showing principal parts of a solid electrolytic capacitor in a comparative example of the invention.

The manganese dioxide layer 4 of the embodiment is formed by a weight of 5 to 15 ng per unit surface area 1 mm$^2$ of the dielectric oxide layer 3. If the weight of the manganese dioxide layer 4 is less than 5 ng/1 mm$^2$, as shown in FIG. 2, the manganese dioxide layer 4 may not be formed uniformly on the entire surface of the second undulated surface of the dielectric oxide layer 3, and, for example, the manganese dioxide layer 4 may be formed in an insular shape 4a. Accordingly, there is a portion 5a not forming the conductive high polymer layer 5, and the desired capacitance or impedance may not be obtained.

Figure 3:
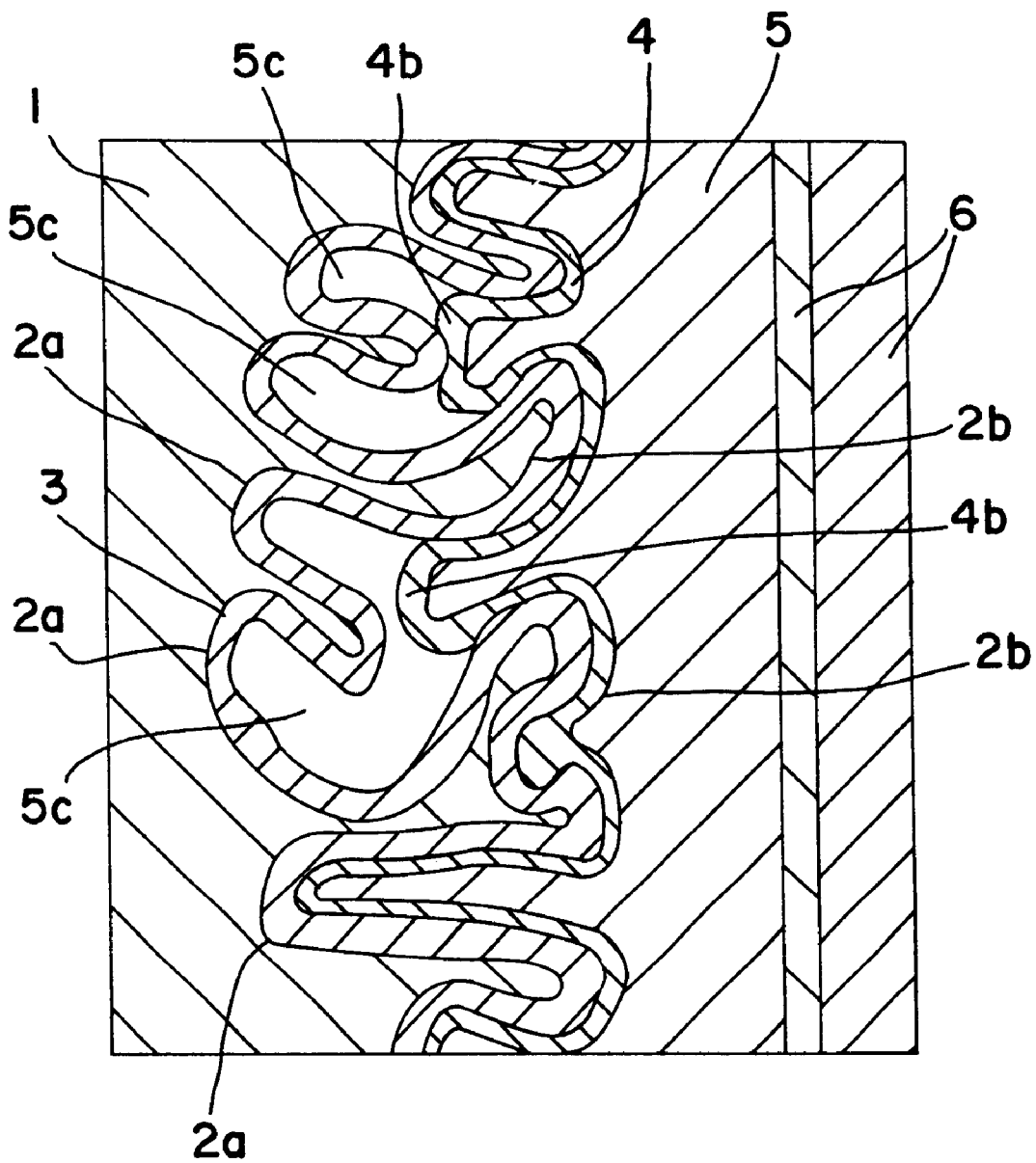
FIG. 3 is a sectional view showing principal parts of a solid electrolytic capacitor in other comparative example of the invention.

Or if the weight of the manganese dioxide layer 4 is more than 15 ng/1 mm$^2$, as shown in FIG. 3, plugging portions 4b may be formed in the manganese dioxide layer 4 to plug the openings of the fine pores 2. As a result, there are gaps 5c not forming the conductive high polymer layer 5, and the desired characteristics may not be obtained.

Therefore, as the condition of forming the manganese dioxide layer 4 completely also on the surface of the dielectric oxide layer 3 positioned inside of the fine pores 2a, what is important is the concentration of aqueous solution of manganese nitrate for forming the manganese dioxide layer 4. The concentration of aqueous solution of manganese nitrate is preferred to be in a range of about 6.5 to about 26.5 wt. %. When the concentration of aqueous solution of manganese nitrate is less than about 6.5 wt. %, the manganese dioxide layer 4 cannot be formed on the surface of the dielectric oxide layer 3 uniformly by a small number of times of pyrolysis treatment. When the concentration of aqueous solution of manganese nitrate is more than about 26.5 wt. %, the viscosity of the aqueous solution of manganese nitrate is too high, and the aqueous solution of manganese nitrate cannot permeate sufficiently into the fine pores 2. As a result, the manganese dioxide layer 4 is not formed uniformly on the surface of the dielectric oxide layer 3. That is, in order to form the manganese dioxide layer 4 uniformly on the surface of the dielectric oxide layer 3, it is preferred to use the aqueous solution of manganese nitrate at a concentration in a range of about 6.5 wt. % to 26.5 wt. %.

In the step of forming the manganese dioxide layer, it is preferred to treat the aqueous solution of manganese nitrate adhered to the surface of the dielectric oxide Layer by pyrolysis in an atmosphere of high humidity, or an atmosphere containing 85±10 vol. % of steam. If having the manganese dioxide layer formed at humidity out of this humidity range, the characteristics of the solid electrolytic capacitor are slightly inferior.

Typical embodiments are described below, but it must be noted that the invention is not limited to these embodiments alone.

Embodiment 1

Figure 4:
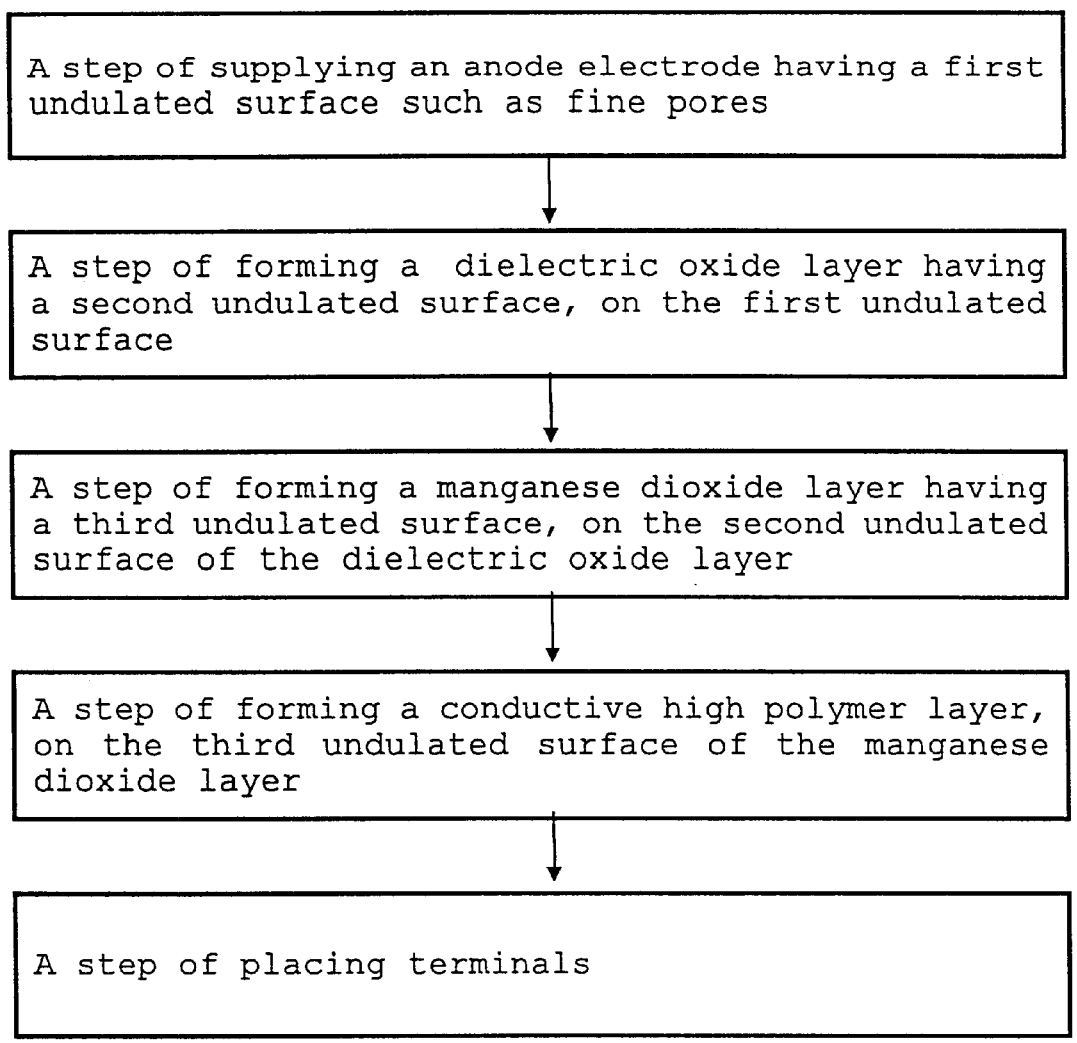
FIG. 4 shows the process of manufacturing method of solid electrolytic capacitor in the embodiment of the invention.

The process of manufacturing method of the solid electrolytic capacitor in the embodiment of the invention is shown in FIG. 4. A roughened aluminum metal foil is prepared. The aluminum metal foil has an undulated surface 2 having multiple fine pores 2a and exposed portions 2b formed by etching process so that the surface area may be about 125 times. That is, the aluminum metal foil has a roughened surface. In part of the surface of the aluminum metal foil, an electric insulating resist tape was glued, and the cathode electrode and anode electrode were separated. Thus, an anode electrode 1 having an effective area of 3.2 mm×3.9 mm was fabricated. This anode electrode 1 was immersed in an aqueous solution of ammonium dihydrogenphosphate at concentration of 0.3 wt. % at liquid temperature of 70° C., and a direct-current voltage of 12 V was applied for 20 minutes. Thus, a dielectric oxide layer 3 was formed on the surface of the aluminum metal foil.

In succession, the anode electrode 1 having the dielectric oxide layer 3 was immersed in an aqueous solution of manganese nitrate at concentration of 20 wt. % at liquid temperature of 25° C. for 3 seconds, and was lifted from the aqueous solution. Then, the excess portion of the aqueous solution of manganese nitrate adhered to the surface of the dielectric oxide layer 3 of the anode electrode 1 was removed by blowing out with air. Then, within one minute after lifting the anode electrode 1 adhered with the aqueous solution of manganese nitrate on the surface of the dielectric oxide layer 3 from the aqueous solution, it was heated to over 250° C., and treated by pyrolysis at 300° C. for five minutes. Thus, the manganese dioxide layer 4 was formed on the surface of the dielectric oxide layer 3 of the anode electrode 1. The pyrolysis was treated in the atmosphere containing about 85±10 vol. % of steam.

Then, the anode electrode 1 having the manganese dioxide layer 4 was immersed in an aqueous solution of ammonium dihydrogenphosphate at concentration of 0.3 wt. % at liquid temperature of 70° C., and a direct-current voltage of 10 V was applied for 10 minutes. Thus, the anode electrode having the manganese dioxide layer 4 was re-formed. On the manganese dioxide layer, a conductive high polymer layer 5 made of polypyrrole film was formed by electrolytic polymerization method. On the conductive high polymer layer 5, further, carbon paste and silver paste were applied sequentially, and a cathode electrode 6 was formed. Terminals were placed in the device having thus formed anode electrode 1, dielectric oxide layer 3, manganese dioxide layer 4, and conductive high polymer layer 5. By resin molding of the outer surface of the device, the casing was formed. Thus, the solid electrolytic capacitor was manufactured.

Embodiment 2

In the foregoing embodiment 1, an aqueous solution of manganese nitrate having a concentration of 25 wt. % was used. A solid electrolytic capacitor was prepared in the same manner as in embodiment 1 except for this method.

Embodiment 3

In the foregoing embodiment 1, an aqueous solution of manganese nitrate having a concentration of 35 wt. % was used. A solid electrolytic capacitor was prepared in the same manner as in embodiment 1 except for this method.

Embodiment 4

The temperature of the aqueous solution of manganese nitrate is 50° C. A solid electrolytic capacitor was prepared in the same manner as in embodiment 1 except for this method.

Embodiment 5

In the foregoing embodiment 1, the time of immersing the anode electrode in the aqueous solution of manganese nitrate was 0.5 sec. A solid electrolytic capacitor was prepared in the same manner as in embodiment 1 except for this method.

Embodiment 6

In the foregoing embodiment 1, the excess aqueous solution of manganese nitrate was pyrolyzed without blowing away. A solid electrolytic capacitor was prepared in the same manner as in embodiment 1 except for this method.

Embodiment 7

In the foregoing embodiment 1, the pyrolysis was performed without applying humidity in the process of pyrolysis. A solid electrolytic capacitor was prepared in the same manner as in embodiment 1 except for this method.

Embodiment 8

In the foregoing embodiment 1, the humidity in pyrolysis process was adjusted to 50% RH. A solid electrolytic capacitor was prepared in the same manner as in embodiment 1 except for this method.

Embodiment 9

In the foregoing embodiment 1, the time required for heating up to 250° C. was more than three minutes after lifting the anode electrode from the aqueous solution, and the holding time at 300° C. was one minute. A solid electrolytic capacitor was prepared in the same manner as in embodiment 1 except for this method.

Embodiment 10

In the foregoing embodiment 1, the pyrolysis temperature was 250° C. A solid electrolytic capacitor was prepared in the same manner as in embodiment 1 except for this method.

Using various solid electrolytic capacitors fabricated in these manners, initial characteristics were measured. Results are summarized in Table 1. The measuring temperature was 25 to 30° C. The capacitance and tan δ was measured at 120 Hz, and the impedance was measured at 400 kHz. To measure the leak current, after applying direct-current voltage of 6.3 V, the current was measured 30 seconds later. In each one of these samples of the embodiments, 30 capacitors were used, and the average of 30 pieces is shown in Table 1. In the samples of embodiments 1 to 3, the solid electrolytic capacitors were completely dissolved, and the deposit amount of manganese dioxide was measured by atomic absorption method.

TABLE 1

|  | Capacitance ($\mu$F) | tan δ (%) | Impedance (mΩ) | Leak current (nA) | Deposit amount of maganese dioxide (ng/mm$^2$) |
| --- | --- | --- | --- | --- | --- |
| Embodiment 1 | 10.35 | 0.9 | 48 | 25 | 11.7 |
| Embodiment 2 | 11.05 | 0.8 | 45 | 28 | 14.1 |
| Embodiment 3 | 8.63 | 1.7 | 102 | 30 | 21.5 |
| Embodiment 4 | 10.42 | 0.9 | 53 | 236 | — |
| Embodiment 5 | 7.54 | 2.3 | 113 | 60 | — |
| Embodiment 6 | 9.20 | 1.8 | 107 | 32 | — |
| Embodiment 7 | 9.21 | 1.2 | 80 | 354 | — |
| Embodiment 8 | 9.59 | 1.1 | 74 | 267 | — |
| Embodiment 9 | 8.59 | 1.1 | 95 | 53 | — |
| Embodiment 10 | 8.27 | 0.8 | 88 | 42 | — |

As clear from Table 1, in the solid electrolytic capacitors manufactured by the manufacturing methods of embodiments 1 and 2, without damaging the dielectric oxide layer of the anode electrode having fine pores, the manganese dioxide layer was formed uniformly on the entire surface off the second undulated surface including the fine pores and exposed portions of the dielectric oxide layer. Accordingly, the conductive high polymer layer in the subsequent step of electrolytic polymerization was securely formed on the entire surface of the inner surfaces of fine pores and exposed portion surfaces of the third undulated surface. All characteristics of capacitance, tan δ impedance and leak current satisfied the desired values. By contrast, as shown in embodiments 3 to 10, the capacitors manufactured in the methods of high concentration condition of aqueous solution of manganese nitrate, high temperature condition, short immersion time condition, condition without removal of excessive adhered portion, insufficient condition of humidity in pyrolysis process, long heating time condition to pyrolysis temperature, or low pyrolysis temperature condition were inferior in some of the characteristics of capacitance, tan δ, impedance and leak current as compared with the capacitors manufactured in the conditions of embodiments 1 and 2.

Thus, according to the method of the invention, without damaging the dielectric oxide layer of the anode electrode having the undulated surface of fine pores and the like, a manganese dioxide layer continuous to the undulated surface can be formed on the entire surface of undulated surface including the inner surface of fine pores and exposed portion surfaces. Gaps in the undulated surface are decreased significantly. Accordingly, the conductive high polymer layer by electrolytic polymerization can be formed securely on the entire surface from the inner surfaces of fine pores to the outer surfaces. Therefore, the solid electrolytic capacitor having excellent characteristics in all characteristics including capacitance, impedance and leak current can be obtained.

What is claimed is:

1. A solid electrolytic capacitor comprising:
   (a) an anode electrode having a first undulated surface,
   (b) a dielectric oxide layer placed on said first undulated surface of said anode electrode,
      said dielectric oxide layer having a second undulated surface placed continuously coinciding with the shape of said first undulated surface,
   (c) a manganese dioxide layer placed on said second undulated surface of said dielectric oxide layer,
      said manganese dioxide layer having a third undulated surface placed continuously coinciding with the shape of said second undulated surface, on said second undulated surface of said dielectric oxide layer,
   (d) a conductive high polymer layer placed on said third undulated surface of said manganese dioxide layer, and a cathode layer placed above said conductive high polymer layer.

2. The solid electrolytic capacitor of claim 1, wherein said first undulated surface has a surface with a plurality of fine pores and exposed portions.

3. The solid electrolytic capacitor of claim 1, wherein said anode electrode having said first undulated surface has a porous sinter of valve metal.

4. The solid electrolytic capacitor of claim 1, wherein said anode electrode having said first undulated surface has a roughened metal foil.

5. The solid electrolytic capacitor of claim 1, wherein said conductive high polymer layer has a conductive high polymer layer formed by electrolytic polymerization.

6. The solid electrolytic capacitor of claim 1,
   wherein said first undulated surface has first fine pores and first exposed portions,
   said second undulated surface has second fine pores and second exposed portions, and
   said manganese dioxide layer is placed on an entire surface of a surface of said second fine pores of said dielectric oxide layer and a surface of said second exposed portions thereof.

7. The solid electrolytic capacitor of claim 1,
   wherein said anode electrode having said first undulated surface has at least one of porous sinter of valve metal and roughened metal foil,
   said conductive high polymer layer has a conductive high polymer layer formed by electrolytic polymerization, and
   said manganese dioxide layer is placed on the entire surface of said dielectric oxide layer.

8. The solid electrolytic capacitor of claim 1, wherein said manganese dioxide layer is placed in a range of about 5 ng to about 15 ng in 1 $mm^2$ of said dielectric oxide layer.

9. The solid electrolytic capacitor of claim 1, wherein said manganese dioxide layer is a layer formed by pyrolysis of aqueous solution of manganese sulfate in a concentration range of about 6.5 wt. % to 26.5 wt. %.

10. The solid electrolytic capacitor of claim 1, wherein said manganese dioxide layer is placed in contact with an entire surface of a concave and a convex portion of said second undulated surface.

11. The solid electrolytic capacitor of claim 1, wherein said conductive high polymer layer is placed in contact with an entire surface of a concave and a convex portion of said second undulated surface.

* * * * *